United States Patent
Vierbergen

(10) Patent No.: US 9,926,141 B2
(45) Date of Patent: Mar. 27, 2018

(54) TRANSPORT SYSTEM

(71) Applicant: Robert Bosch GmbH, Stuttgart (DE)

(72) Inventor: Robert Vierbergen, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/885,270

(22) Filed: Oct. 16, 2015

(65) Prior Publication Data
US 2016/0114983 A1    Apr. 28, 2016

(30) Foreign Application Priority Data

Oct. 27, 2014   (EP) .................................... 14190424

(51) Int. Cl.
| | |
|---|---|
| *B65G 43/00* | (2006.01) |
| *B65G 43/08* | (2006.01) |
| *B65G 47/28* | (2006.01) |
| *G05B 19/418* | (2006.01) |

(52) U.S. Cl.
CPC ............. *B65G 43/08* (2013.01); *B65G 47/28* (2013.01); *G05B 19/4185* (2013.01); *G05B 19/4189* (2013.01); *B65G 2811/095* (2013.01); *G05B 2219/15072* (2013.01); *G05B 2219/31152* (2013.01); *Y02P 90/18* (2015.11); *Y02P 90/28* (2015.11)

(58) Field of Classification Search
CPC ................................ B65G 43/08; B65G 47/28
USPC .................................................... 198/810.03
See application file for complete search history.

(56) References Cited

U.S. PATENT DOCUMENTS

| | | | | | |
|---|---|---|---|---|---|
| 3,974,778 | A | * | 8/1976 | Black ..................... | B60L 15/005 104/292 |
| 4,849,664 | A | * | 7/1989 | Miyazaki .............. | B60L 15/005 104/290 |
| 4,876,966 | A | * | 10/1989 | Okawa .................. | B60L 15/005 104/290 |
| 5,400,204 | A | * | 3/1995 | Oshima .................. | B66B 7/064 187/277 |
| 5,641,963 | A | * | 6/1997 | Mueller ............... | G08B 13/193 250/342 |
| 6,671,636 | B2 | * | 12/2003 | Dawson ................. | G01R 11/25 340/870.02 |

(Continued)

FOREIGN PATENT DOCUMENTS

| | | |
|---|---|---|
| EP | 1 793 293 A1 | 6/2007 |
| EP | 1 897 825 A1 | 3/2008 |
| EP | 2 048 560 A1 | 4/2009 |

OTHER PUBLICATIONS

European Search Report corresponding to EP Application No. 14190424.3, dated May 8, 2015; European Patent Office, Munich, Germany; (7 pages).

*Primary Examiner* — William R Harp
(74) *Attorney, Agent, or Firm* — Maginot, Moore & Beck LLP

(57) ABSTRACT

A transport system for linear movements includes at least two sensors configured to determine a position of one or more carriers along a carrier track. Each of the sensors are interconnected with each other and arranged in a daisy-chained manner along the carrier track. The sensors create a position sensor bus configured to transmit a digital position sensor signal. The transport system further includes a motion controller connected to the sensor bus and configured to control at least one position of the carriers along the carrier track.

8 Claims, 1 Drawing Sheet

(56) References Cited

U.S. PATENT DOCUMENTS

| | | |
|---|---|---|
| 6,738,920 B1 | 5/2004 | Home |
| 7,245,217 B2 * | 7/2007 | Tsai ..................... B61L 23/041 |
| | | 340/541 |
| 7,275,445 B2 * | 10/2007 | Friedrichs ............. G01L 19/083 |
| | | 330/6 |
| 7,394,244 B2 * | 7/2008 | Schley ................... G01D 5/252 |
| | | 324/207.2 |
| 7,523,239 B2 * | 4/2009 | Shimizu ............ H04L 12/40169 |
| | | 710/110 |
| 2008/0077254 A1 * | 3/2008 | Jeske .............. G05B 19/41895 |
| | | 700/8 |
| 2008/0183914 A1 * | 7/2008 | Gorbold ............. G06F 13/4247 |
| | | 710/26 |
| 2009/0317217 A1 * | 12/2009 | Nishimura ............. B62D 1/283 |
| | | 414/222.03 |

\* cited by examiner

TRANSPORT SYSTEM

This application claims priority under 35 U.S.C. §119 to patent application no. EP 14190424.3 filed on Oct. 27, 2014 in Germany, the disclosure of which is incorporated herein by reference in its entirety.

The disclosure relates to a transport system for linear movements as well as a use of a transport system according to the claimed subject matter.

BACKGROUND

In particular, the present transport system comprises at least two sensors which are capable of and used for determining a position of one or more carriers along a carrier track, wherein each of the sensors being interconnected with each other and being arranged in a daisy chained manner along the carrier track.

However, transport systems and in particular transport systems in the form of linear modular systems (LMS) are already well-known from prior art. In particular, it is known from prior art that a LMS system comprises a transport track that uses many positioned measurement sensors to measure the position of the carriers on a track. Setting up a single track requires, however, a lot of cabling and additional electronics to manage all sensor signals. This also increases the chance of track commissioning problems as a result of a faulty cable.

In particular, current position sensors produce multiple analogue signals. Each sensor is therefore connected to an analogue multiplexer and the multiplexer is again connected to a motion controller, wherein the motion controller uses the analogue signals to determine the position of the carriers on the LMS track.

As already implied above, a production and commissioning of a LMS track takes a lot of effort. One of the main reasons is the amount of complexity of the sensor cables that need to be fabricated and tested before getting the track in operation. Once assembled, the cabling can also be wrongly connected (e.g. two sensor connections are inverted).

SUMMARY

Therefore, it is an object of the present disclosure to solve the above-mentioned problems and provide a transport system, in particular a transport system using LMS, which particularly easily simplifies the design of an LMS track and therefore reduces the complexity of transport systems.

Said object is solved by the claimed subject matter.

In order to solve the present object, the hereby proposed disclosure makes, inter alia, use of the fact that said sensors create a position sensor bus by transmitting, in particular only, a digital position sensor signal, the sensor bus being connected to a motion controller, said motion controller controlling at least one position of the carriers along the carrier track.

In particular, one core element of the present disclosure is to let the sensors communicate digitally instead of analogously as the prior art teaches. Consequently, via the daisy-chained arrangement of each of the sensors relative to each other in connection with the digitalized position sensor signal of each of the sensors, a lot of cabling can be completely omitted as a digital signal can be assigned very easily to a particular sensor.

This particular easy assignment cannot in any way be done by cited prior art's analogous multiplexing. At best, cited prior art namely provides a solution only in such a way that each sensor is connected to an analogue multiplexer, said analogue multiplexers are connected again to the motion control so that the motion controller uses the analogue signals to determine the position of the carriers on a LMS track.

Contrarily to this, we presently use a digital communication bus between each of the sensors and the motion control system so that not only the communication between the sensor source can be digitalized but also the communication between the motion control and at least one sensor can be digitalized. The digital communication bus therefore supports daisy chaining. In this way, for example, a first sensor can be connected to the motion system and a further second sensor can be connected to the first sensor and so on, so that the position sensor signals can be transported digitally between each of the sensors themselves.

Such a daisy-chained, digital base transport system therefore leads to less cables meaning less chance of cable problems (faulty connections, damaged cables, . . . ) which particularly easily simplifies track design in cable routing, reduces the time required commission, the LMS track (less trouble shooting), improves diagnostics from position sensors and lowers the price of the whole LMS track. The reason for this is, inter alia, that only one of the sensors is cable connected or wirelessly connected to the motion controller. A separate connection of the other sensor to analog multiplexers, arranged in between the motion controller and the different sensor, can advantageously be omitted.

According to at least one embodiment, the transport system for linear movements comprises at least two sensors, which are capable of and used for determining a position of one or more carriers along a carrier track, wherein each of the sensors being interconnected with each other and being arranged in a daisy-chained manner along the carrier track.

One core element of the present disclosure is that said sensors create a position sensor bus by transmitting, in particular only, a digital position sensor signal, the sensor bus being connected to a motion controller, said motion controller controlling at least one position of the containers along the carrier track.

According to at least one embodiment, the motion controller uses sensor data of the sensors to determine a position of at least one carrier along the carrier track. Since in the present disclosure, a signal communication between each of the sensors and/or between at least one sensor and the motion controller is done digitally due to daisy-chaining of the sensors an easy position determination of the carriers along the carrier track can be done.

According to at least one embodiment, the sensor bus is a digital communication bus to connect the sensors to the motion controller. That means that not only the sensors are transmitting digital signals but that also the whole sensor bus is relying for example purely on digital signals.

Therefore, it is thinkable that the position sensor bus is free from an analogue multiplexing so that analogue signals are completely omitted.

According to at least one embodiment, a first sensor is connected, in particular directly, and in particular, by the position sensor bus, to a motion system, and one further sensor is again connected, particular directly, to the first sensor, wherein the position sensor signals of the sensors are multiplexed digitally. This arrangement fully reflects the "digital daisy-chaining" so that for example only one of the sensors is directly connected to the motion controller of the motion system. Therefore, the motion system can comprise said motion controller or alternatively can be a separate element.

According to at least one embodiment, the transport system comprises a cable break detection system detecting a cable break of the bus system and/or of the motion system. Said cable break detection system therefore significantly enhances the security of the whole transport system without interfering into the digital position detection.

According to at least one embodiment, configuration parameters of the sensors are at least partially stored within each sensor. This means that each of the sensors can comprise an input and/or storage means so that each of the sensors can be programmed independently from other sensors. However, it is also possible that there is a certain grouping of sensors comprising the same or similar pre-programming parameters at least in one programming layer. Such a grouping can for example be advantageous when synchronizing of the sensors of the whole detection system should be made as easy as possible.

For example, such a transport system can be used as a transport system to carry wavers and/or waver products and/or can be used in applications such as LCD/OLED displays, flexible or coating assembly lines. The reason for the specific appliance of the transport system in the field of waver transporting or waver production is that within a clean room a lot of cabling and a large complexity should in any case by prevented. The reason for this is, inter alia, that a lot of cabling increases the risk of leakage within the cable or a non-functionality so that within a clean room repairing such a leakage is very hard to conduct without contaminating the clean room. Also reducing the amount of cables makes it easier for the user to keep the whole transport system clean and/or even sterile.

Within the subsequent text, the above-mentioned transport system is depicted in more detail.

DETAILED DESCRIPTION

Figure 1:
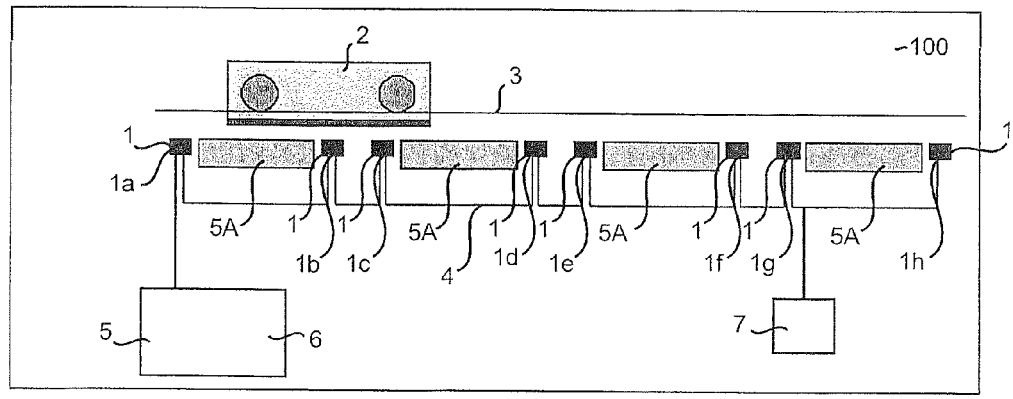
FIG. 1 shows a transport system comprising a modular position sensor bus according to the present disclosure.
Figure 2:
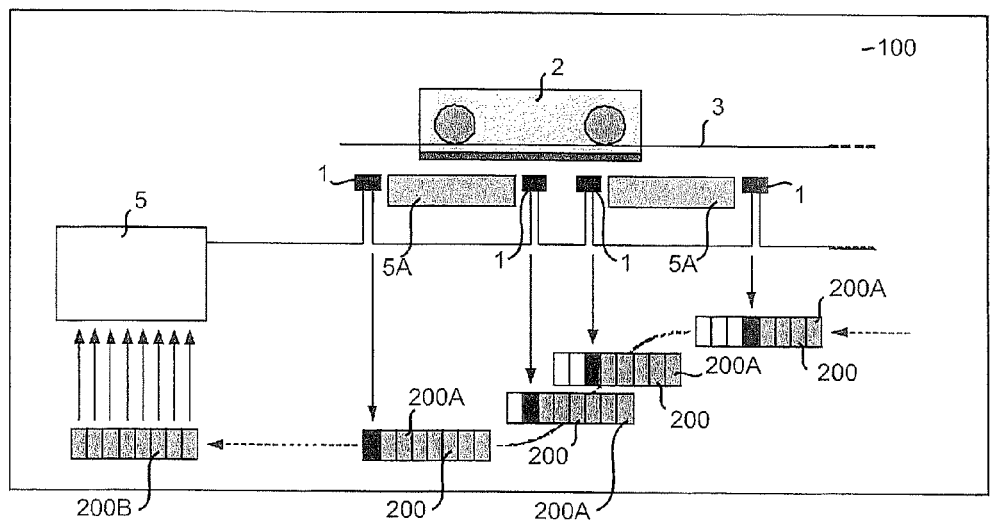
FIG. 2 shows a principle of the sensor data transmitted from the sensors to the motion controller.

Within the embodiment according to FIGS. 1 and 2, the same elements are assigned to same reference signs.

In particular, FIG. 1 shows a transport system 100 for linear movements according to one embodiment of the present disclosure. It can be discerned from FIG. 1 that the transport system 100 comprises a multiplicity of sensors 1 which are each capable and used for determining a position of a carrier 2 along a carrier track 3.

In the present example of FIG. 1 said carrier 3 is moved by electromagnetic forces wherein below each of the carrier 2 and below the carrier track 3, electromagnetic actuators are arranged along the carrier track 3. Said electromagnetic actuators are given the reference sign 5A.

In particular, the sensors 1 are not only arranged on each of the ends of the carrier track 3 but are also arranged between each of the actuators 5A and are interconnected with each other via bus lines so that they are defining a daisy-chained arrangement along the carrier track 3.

In other words, said sensors 1 create a position sensor bus 4 by transmitting, in particular only, a digital position sensor signal, wherein the sensor bus 4 is connected to a motion controller 5, said motion controller 5 controlling at least one position of the carriers 2 along the carrier track 3.

In particular, said multicity of sensors 1 can be subdivided into sensors 1a, 1b 1e, 1d and so on wherein the most left sensor 1a is connected by a first bus line to a further sensor 1b so that along the main extension direction of the carrier 3, the two sensors 1a, 1b generate an arrangement space for a first actuator 5A.

The core of the disclosure is—as outlined above—that signals interchanged are only digital signals instead of being analogue signals so that both the sensors 1 among each other as well as the sensors 1 with the motion controller 5 do communicate only by digital signal communication.

In other words, the sensor bus 4 as well as the transport system 100 is free from analogue multiplexing so that in general a multiplexing can be totally omitted. Instead of the sensors 1 being connected to an analogue multiplexer, said multiplexer being connected to a motion control system, the present disclosure provides the solution that only the first sensor 1a is directly connected to the motion controller 5 and each subsequently arranged sensor 1b, 1e, 1d and so on is in a daisy-chain connection with the previous sensor.

Furthermore, the transport system 100 comprises a cable break detection system 7 detecting a cable break of the bus system 4 and/or a motion system 6 which ensures that the transport system 100 can be driven specifically in a secure manner and without a large monitoring system. In particular, within the hereby described embodiment the cable detection system 7 consists of sub detection systems capable of working independently from each other, wherein in each of the sensors 1 at least one such sub detection system in integrated. This ensures very easy detection of cable breaks also on wires in between neighboring sensors 1.

FIG. 2 teaches the transport system 100 of FIG. 1, however, with particular emphasis towards how the sensor data is transmitted from the sensors 1 to the motion controller 5.

As can be discerned from FIG. 2, the detected signal of each of the sensors 1a, 1b, 1c, 1d and so on can be subdivided in a scale-like manner via a scale 200. Said scale 200 comprises subdivisions 200A wherein each of the subdivisions 200A can be assigned uniquely to a specific sensor 1.

By daisy-chain accumulation of each of the measured signals represented by a corresponding scale-like representation within the scale 200, said signals can be accumulated and added to an end signal 200B.

Said end signal 200B is subsequently transported to the motion controller 5. In that sense, FIG. 2 therefore does not only show how the sensors 1 and in particular the position sensor bus 4 simplify the cable layout but also show the principle how the sensor data is transmitted from the sensors 1 to the motion controller 5.

Therefore, a solution is proposed which leads to less cable means, less chance of cable problems and the like and also simplifies the track design and cable routing so that a transport system 100 in particular for transporting wavers for example within a clean room is provided so that only basic maintenance need to keep the transport system 100 operating.

LIST OF REFERENCE SIGNS 1, 1a, 1b, 1c, 1d sensors
2 carrier
3 carrier track
4 sensor bus 5 motion controller
5A electromagnetic actuators/first actuator
6 motion system
7 detection system
100 transport system
200 scale
200A subdivisions
200B end signal

What is claimed is:

1. A transport system for linear movements, comprising:
at least two sensors configured to determine a position of one or more carriers along a carrier track, each of the at least two sensors being interconnected with each other and arranged in a daisy-chained manner along the carrier track to create a position sensor bus configured to transmit a digital position sensor signal;
a motion controller connected to the sensor bus and configured to control at least one position of the carriers along the carrier track; and
a scale including at least two subdivisions, each subdivision corresponds uniquely to one sensor in the at least two sensors, the scale being configured to:
add measurement data from each of the at least two sensors into the at least two subdivisions of the scale in response to the one or more carriers passing each sensor; and
transmit the scale as an end signal to the motion controller to enable the motion control to identify the measurement data that are specific to each of the at least two sensors based on the at least two subdivisions in the scale.

2. The transport system according to claim 1, wherein the motion controller is furthered configured to determine the position of at least one carrier along the carrier track using sensor data of the at least two sensors.

3. The transport system according to claim 1, wherein the sensor bus is a digital communication bus configured to connect the at least two sensors to the motion controller.

4. The transport system according to claim 1, further comprising:
a first sensor connected to a motion system by the position sensor bus and configured to provide a first position sensor signal; and
a second sensor connected to the first sensor and configured to provide a second position sensor signal,
wherein the first and second position sensor signals are multiplexed digitally.

5. The transport system according claim 4, further comprising:
a cable break detection system configured to detect a cable break of at least one of the bus system and of the motion system.

6. The transport system according to claim 1, wherein the position sensor bus performs digital multiplexing.

7. The transport system according to claim 1, further comprising configuration parameters of the at least two sensors, wherein the configuration parameters are at least partially stored within each of the at least two sensors.

8. The transport system according to claim 1, wherein the transport system is configured to carry at least one of wafers and wafer products.

* * * * *